United States Patent
Tatsuda

(10) Patent No.: US 8,448,543 B2
(45) Date of Patent: May 28, 2013

(54) CLAMPING DEVICE FOR ROTARY INDEX DEVICE FOR MACHINE TOOL

(75) Inventor: Yoshinori Tatsuda, Kanazawa (JP)

(73) Assignee: Tsudakoma Kogyo Kabushiki Kaisha, Kanazawa-shi, Ishikawa (JP)

( * ) Notice: Subject to any disclaimer, the term of this patent is extended or adjusted under 35 U.S.C. 154(b) by 743 days.

(21) Appl. No.: 12/665,171

(22) PCT Filed: Jul. 9, 2008

(86) PCT No.: PCT/JP2008/062393
§ 371 (c)(1),
(2), (4) Date: Dec. 17, 2009

(87) PCT Pub. No.: WO2009/008443
PCT Pub. Date: Jan. 15, 2009

(65) Prior Publication Data
US 2010/0175505 A1  Jul. 15, 2010

(30) Foreign Application Priority Data
Jul. 12, 2007 (JP) ................. 2007-183314

(51) Int. Cl.
*B23Q 1/26* (2006.01)
*B23Q 16/10* (2006.01)

(52) U.S. Cl.
CPC ........... *B23Q 16/102* (2013.01); *B23Q 16/105* (2013.01)
USPC ............. 74/813 R; 74/813 L; 74/822; 269/57

(58) Field of Classification Search
USPC .................. 74/813 R, 813 L, 822; 269/57
See application file for complete search history.

(56) References Cited

U.S. PATENT DOCUMENTS

| | | | | |
|---|---|---|---|---|
| 5,526,715 | A * | 6/1996 | Swann et al. | 74/822 |
| 6,240,807 | B1 * | 6/2001 | Hebener et al. | 74/813 R |
| 2010/0123278 | A1 * | 5/2010 | Tatsuda | 269/57 |
| 2010/0319487 | A1 * | 12/2010 | Tatsuda | 74/813 L |
| 2012/0217691 | A1 * | 8/2012 | Tatsuda | 269/57 |

FOREIGN PATENT DOCUMENTS

| | | |
|---|---|---|
| DE | 103-32-424 A1 | 2/2005 |
| JP | 61-019103 U | 2/1986 |

(Continued)

OTHER PUBLICATIONS

Machine Translation of DE 103 32 424 A1, Holter, Feb. 24, 2005.*

(Continued)

*Primary Examiner* — Vinh Luong
(74) *Attorney, Agent, or Firm* — Westerman, Hattori, Daniel & Adrian, LLP

(57) ABSTRACT

In a rotary index device for a machine tool, in which the index position of, for example, a circular table is maintained by normally clamping a clamp disc with a clamping mechanism and in which, for example, the circular table is unclamped by an unclamping mechanism when an indexing operation is performed, the clamping mechanism includes a fixing portion, a resiliently deformable supporting portion, and an urging mechanism. The fixing portion is fixed to a housing of the rotary index device for the machine tool. One end of the supporting portion is secured to the fixing portion, and a pressing portion having a face that opposes the clamp disc is secured to the other end of the supporting member. The urging mechanism normally urges the supporting portion towards the clamp disc to realize a state in which the clamp disc is pressed by the pressing portion.

2 Claims, 3 Drawing Sheets

| | FOREIGN PATENT DOCUMENTS | |
|---|---|---|
| JP | 3-178709 A | 8/1991 |
| JP | 5-208314 A | 8/1993 |
| JP | 05-212646 A | 8/1993 |
| JP | 6-24833 U | 4/1994 |
| JP | 2006-095668 A | 4/2006 |
| JP | 2007-125640 A | 5/2007 |

OTHER PUBLICATIONS

Supplementary European Search Report dated Mar. 28, 2011, issued in corresponding European Patent Application No. 08778002.9.
International Search Report of PCT/JP2008/062393, mailing date of Aug. 19, 2008.

* cited by examiner

CLAMPING DEVICE FOR ROTARY INDEX DEVICE FOR MACHINE TOOL

TECHNICAL FIELD

The present invention relates to a clamping device for a rotary index device, such as a rotary table device, used in a machine tool.

BACKGROUND ART

Patent Document 1 discloses a clamping mechanism of a rotary table device. The clamping mechanism clamps a rotary shaft, to which a circular table is secured, by a clamp disc (brake plate) and a piston serving as clamping means. The clamp disc is mounted to the rotary shaft so as to be incapable of rotating relative to the rotary shaft. The piston is normally urged towards the clamp disc by a coil spring (compression spring).

In the disc type clamping device described above, in order to set the clamp disc in a state in which it is clamped by a piston, that is, in order to set the clamp disc in a state in which it is held so as to be incapable of rotating, it is necessary for the piston to be in a state in which it is incapable of rotating with respect to a housing (frame body). That is, it is necessary for the piston to be provided so that it is capable of moving in an axial direction of the rotary shaft (urging direction towards the clamp disc) and so that it is incapable of rotating relative to the housing in a rotation direction of the rotary shaft.

Accordingly, in the type in which the clamp disc is clamped by displacing the piston with respect to the housing in the axial direction of the rotary shaft, the piston needs to have a structure that stops its rotation, thereby complicating the internal structure of a rotary table device and increasing manufacturing costs.

For example, a structure that slides and guides the piston in the axial direction of the rotary shaft by bringing the piston into contact with a surface of the housing in a direction intersecting with the rotation direction of the rotary shaft and a structure in which the piston is slid and guided in the axial direction of the rotary shaft by a shaft secured to the housing and passed through the piston are available as the aforementioned structure for stopping the rotation. However, in these structures, friction is generated between the piston and a sliding-guiding surface through long-term use, and rattling between the piston and the sliding-guiding surface is increased. As a result, the clamped state cannot be stably maintained. In particular, if a force acts upon the circular table when processing a workpiece, displacement occurs with respect to an indexed angular position in correspondence with the rattling, thereby reducing indexing precision (processing precision).

Patent Document 1: Japanese Unexamined Patent Application Publication No. 2006-95668

DISCLOSURE OF INVENTION

Problems to be Solved by the Invention

Therefore, it is an object of the present invention to provide a clamping device for a rotary index device for a machine tool, in particular, a normal clamp type clamping device, in which the structure thereof can be simplified and in which a stabilized positioning performance can be maintained.

Means for Solving the Problems

To this end, the present invention provides the following structure. A rotary index device (1) for a machine tool includes a rotary shaft (5), a clamp disc (11), and clamping means (6), the rotary shaft (5) being rotatably provided in a housing (3) and having a member that is rotationally driven (4) mounted to an end portion thereof, the clamp disc (11) being mounted to the rotary shaft (5) so as to be incapable of rotating relative to the rotary shaft (5), the clamping means (6) pressing the clamp disc (11) against a clamp surface (12), integrated to the housing (3), and clamping the clamp disc (11) in cooperation with the clamp surface (12); in which the clamping means (6) is normally urged towards the clamp disc (11) by urging means (10) to maintain an index position of the member that is rotationally driven (4), and in which, when an indexing operation is performed, unclamping means (13) stops the urging of the clamping means (6) to cause the member that is rotationally driven (4) to be capable of rotating. In the rotary index device (1), the clamping means (6) includes a fixing portion (7) fixed to the housing (3); a resiliently deformable supporting portion (8) secured to the fixing portion (7) at one end thereof, a pressing portion (9) having a face that opposes the clamp disc (11) being secured to the other end thereof; and the urging means (10) that normally urges the supporting portion (8) towards the clamp disc (11) to realize a state in which the clamp disc (11) is pressed by the pressing portion (9).

In addition, in the aforementioned invention, the clamping means (6) is a spring member (14) in which the fixing portion (7), the supporting portion (8), and the pressing portion (9) are integrally formed with each other.

Further, in the aforementioned invention, the clamping means (6) is the spring member (14) that is a single member having a circular shape existing around the rotary shaft (5).

Advantages

According to the invention of Claim 1, in the rotary index device (1) for the machine tool, in which the index position of the member that is rotationally driven (4), such as a rotary table, is maintained by normally clamping the clamp disc (11) by the clamping means (6) and in which, when an indexing operation is performed, unclamping means (13) causes the clamping means (6) to be set in an unclamped state to cause the member that is rotationally driven (4) to be capable of rotating, the clamping means (6) includes a fixing portion (7), a resiliently deformable supporting portion (8), and urging means (10). The fixing portion (7) is fixed to the housing (3) of the rotary index device (1) for the machine tool. One end of the supporting portion (8) is secured to the fixing portion (7), and a pressing portion (9) having a face that opposes the clamp disc (11) is secured to the other end of the supporting portion (8). The urging means (10) normally urges the pressing portion (9) towards the clamp disc (11) to realize the state in the clamp disc (11) is pressed by the pressing portion (9). That is, the supporting portion (8), including the pressing portion (9) of the clamping means (6), is secured to the housing (3) through the fixing portion (7), and the pressing portion (9) is displaced in an urging direction by resiliently deforming the supporting portion (8). Therefore, compared to the system of the related art in which a clamp disc is clamped by a piston, a structure that guides the piston or a structure that causes the piston to be incapable of rotating in the rotation direction of the rotary shaft is no longer required; and the structure of the clamping means can be simplified. In addition, in the present invention, since the pressing portion (9) that presses the clamp disc (11) is displaced by resiliently deforming the supporting member (8), and the supporting member (8) is secured to the housing (3), it is not necessary to consider the influence of rattling between the piston and the sliding/guiding surface on the positioning precision, which becomes a problem in the system using a piston as clamping means, and it is possible to maintain stabilized positioning performance (indexing precision of the index device) over a long period of time.

According to the invention of Claim 2 based on the invention of Claim 1, the clamping means (6) is a spring member (14) in which the fixing portion (7), the supporting portion (8), and the pressing portion (9) are integrally formed with each other, and the spring member (14) is secured to the housing (3). Therefore, by forming the piston (pressing portion), piston guiding means, and piston urging means, which are separate members in the related piston system, as one member, for example, rattling between each member (which is a related problem) can be overcome, so that mounting precision of the clamping means no longer influences the positioning precision of the rotary index device for the machine tool.

According to the invention of Claim 3 based on the invention of Claim 2, the clamping means (6) is the spring member (14) that is a single member having a circular shape existing around the rotary shaft (5). Therefore, the spring member (14) serving as the clamping means (6) exists along the entire circumference around the rotary shaft (5). It is possible for the circular pressing portion (9) to contact the entire circumference of the clamp disc (11) to cause a uniform press force to act upon the entire clamp disc (11); and it is possible to obtain good braking force, and to prevent local portions of the clamp disc (11) from wearing.

Figure 1:
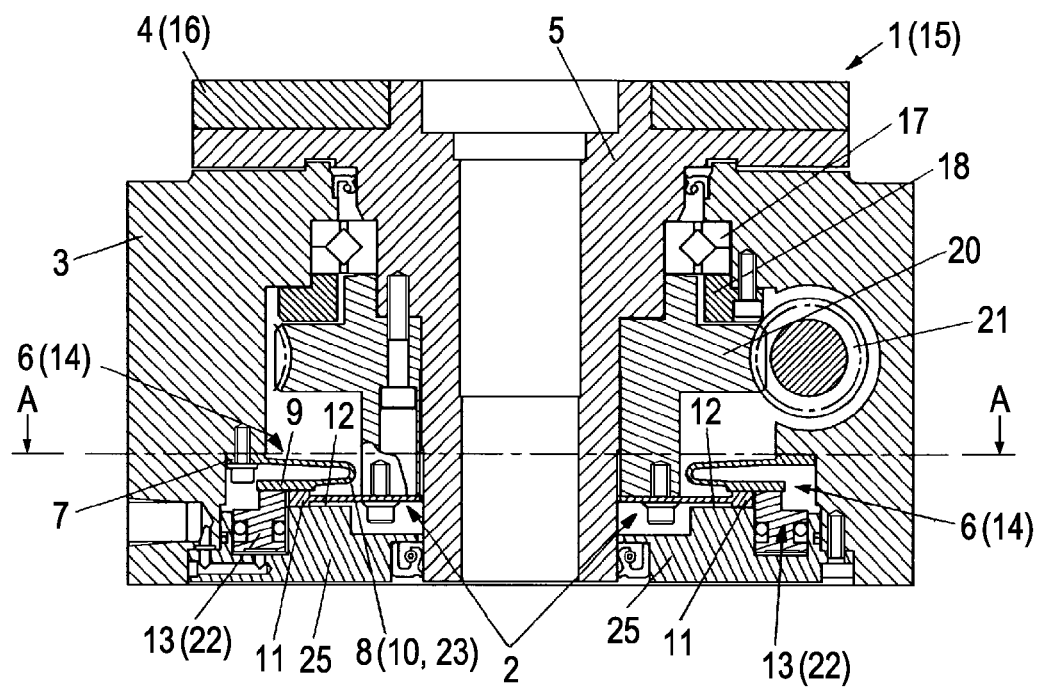
FIG. 1 is an overall view of a rotary index device 1.

REFERENCE NUMERALS 1 rotary index device
2 clamping device
3 housing
4 member that is rotationally driven
5 rotary shaft
6 clamping means
7 fixing portion
8 supporting portion
9 pressing portion
10 urging means
11 clamp disc
12 clamp surface
13 unclamping means
14 spring member
15 rotary table device
16 circular table
17 bearing
18 bearing sleeve
20 worm wheel
21 worm gear
22 piston member
23 spring portion
24 screw member
25 case member
26 fluid port
27 fluid path
28 pressure chamber
29 fixing member
30 clamping member
31 compression spring
32 piston member
33 clamping member
34 compression spring
35 fixing member
36 pressure chamber
37 pressure chamber

BEST MODES FOR CARRYING OUT THE INVENTION

The present invention is applied to a rotary index device for a machine tool, used for indexing an angle of a workpiece.

FIG. 1 shows an embodiment of a rotary table device 15 serving as a rotary index device 1 for a machine tool to which the present invention is applied. The rotary table device 15 is a device in which a circular table 16, which is a member that is rotationally driven 4, is rotatably mounted to a housing 3 serving as a base. The rotary table device 15 is also called an index table or a rotary table.

The rotary table device 15 is described in more detail. The circular table 16 is secured to one end portion of a rotary shaft 5 rotatably provided in the housing 3. The rotary shaft 5 is supported by a bearing 17 secured to the housing 3 by a bearing sleeve 18.

As driving means of the rotary table 16, the rotary table device 15 includes a worm wheel 20 secured to the rotary shaft 5, a worm gear 21 rotatably supported by the housing 3 and engaging the worm wheel 20, and a motor (not shown) that rotationally drives the worm gear 21.

A clamping device 2, which is a distinctive feature of the present invention, is provided at the other end portion of the rotary shaft 5. The clamping device 2 includes a clamp disc 11, a clamp surface 12, a spring member 14, and a piston member 22. The clamp disc 11 is mounted to the rotary shaft 5 so as to be incapable of rotating relative to the rotary shaft 5. The clamp surface 12 is formed at a case member 25 integrally mounted to the housing 3. The spring member 14 serves as clamping means 6 that sets the circular table 16 in a clamped state by normally pressing the clamp disc 11 against the clamp surface 12 and clamping the clamp disc 11 in cooperation with the clamp surface 12. The piston member 22 serves as unclamping means 13 that performs an unclamping operation.

Figure 2:
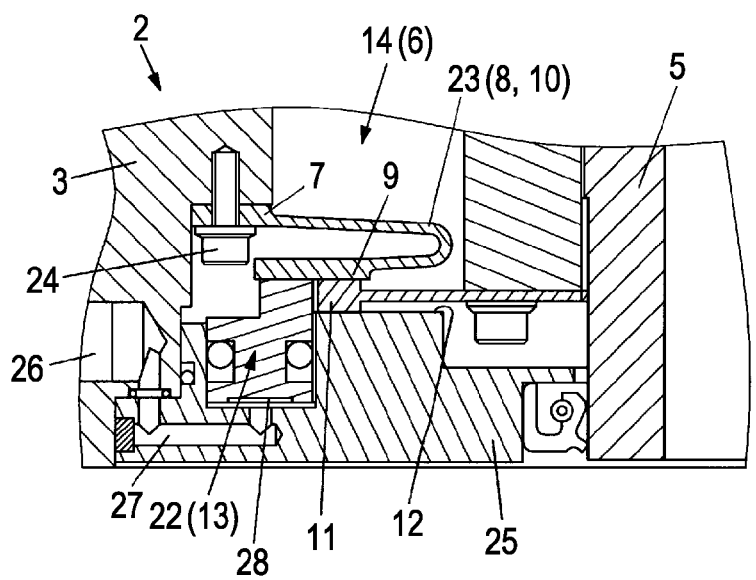
FIG. 2 is a detailed sectional view of the vicinity of a clamping device 2 of the rotary index device 1.
Figure 3:
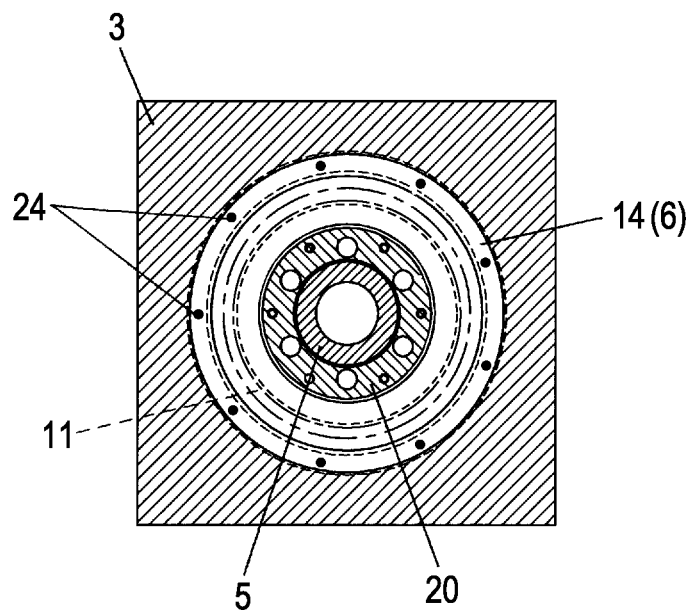
FIG. 3 is a sectional view taken along line A-A in FIG. 1.

FIG. 2 is a detailed sectional view of the vicinity of the clamping device 2 according to the present invention. FIG. 3 is a sectional view taken along line A-A in FIG. 1. The spring member 14 serving as the clamping means 6 in the embodiment has the form of a bellows, and is a single member having a circular shape existing around the rotary shaft 5 (claim 3). The sectional shape of the spring member 14 in an axial direction is a U shape including an arch-shaped spring portion 23 at a rotary shaft-5 side. At a circular planar fixing portion 7 formed at one end of the spring member 14, the spring member 14 is mounted to the housing 3 by a plurality of screw members 24 provided along the circumference, and is fixed to the housing 3 so as to be incapable of rotating relative to the housing 3. A circular planar pressing portion 9 opposing the clamp disc 11 is formed at the other end of the spring member 14. The pressing portion 9 can contact a surface of the clamp disc 11 along the entire circumference around the rotary shaft 5. In addition, the pressing portion 9 is supported by the resiliently deformable spring portion 23 so as to be displaceable in an axial direction, and is joined (integrated) to the fixing portion 7 (claim 2). Therefore, in the embodiment, the spring portion 23 corresponds to the "supporting portion (8)" and "urging means (10)" in the present invention (claim 1).

The spring member 14 is built in the housing 3 while being compressed in an axial direction of the rotary shaft 5. By the restoring force of the flexed spring portion 23, the pressing portion 9 is normally urged towards the clamp disc 11, normally presses the clamp disc 11, and normally clamps the clamp disc 11 in cooperation with the clamp surface 12 of the case member 25.

In the embodiment, the piston member 22 serving as the unclamping means 13 that performs an unclamping operation has an externally annular shape. The piston member 22 is fitted to and inserted into an annular groove formed in the case member 25, and can be slidably displaced in the axial direction of the rotary shaft 5 in the groove. Operating fluid (such as pressure oil or compressed air) is supplied from a fluid port 26, provided for the operating fluid and formed in the housing 3, to a pressure chamber 28, disposed between the case member 25 and the piston member 22, through a fluid path 27, formed in the case member 25.

When performing an indexing operation of the circular table 16, the operating fluid is supplied to the pressure chamber 28 to displace the piston member 22 towards the clamping means 6, and the pressing portion 9 is pressed towards a side opposite to the clamp disc 11. By deformation of the spring portion 23, the pressing portion 9 is displaced in a direction in which press force with respect to the clamp disc 11 is reduced (in a direction in which the pressing portion 9 moves away from the clamp disc 11). This eliminates clamp force of the clamping means 6, thereby causing the rotary table device 15 to be in an unclamped state and the circular table 16 (the rotary shaft 5) to be in a rotatable state. After the indexing operation, the supply of the operating fluid is stopped. This pushes down the piston member 22 by the restoring force of the spring portion 23 of the clamping means 6 (the spring member 14), so that the pressing portion 9 is set in a state (clamped state) in which the pressing portion 9 presses the clamp disc 11, and the rotary table 16 is held at a predetermined index position.

Figure 4:
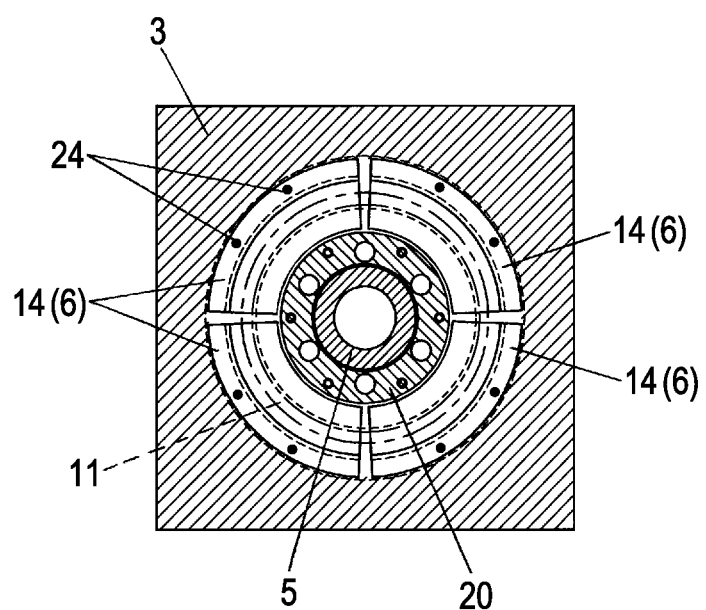
FIG. 4 is a sectional view taken along line A-A in FIG. 1.

Although, in the embodiment, the clamping means 6 is a spring member having the form of a bellows, the clamping means 6 may be one disc spring or two or more disc springs. In addition, in the embodiment, the spring member 14 is a circular spring member existing along the entire circumference around the rotary shaft 5. However, for example, as shown in FIG. 4, the spring member 14 may be such that, for example, a bellows spring or a disc spring is divided into two or more portions (four portions in the illustration) and each divided portion is secured to the housing.

Figure 5:
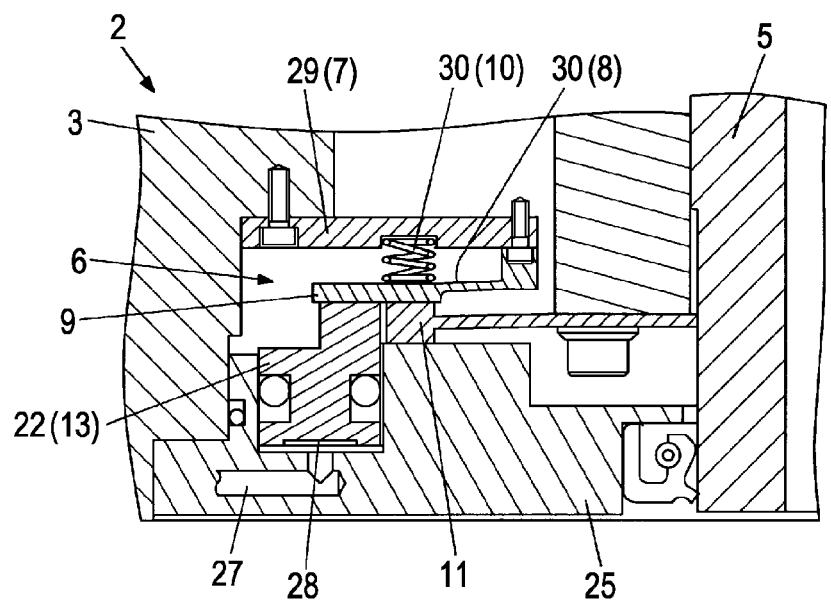
FIG. 5 is a detailed sectional view of the vicinity of a clamping device 2 of the rotary index device 1.

FIG. 5 shows another embodiment of the present invention. The clamping means 6 is not limited to one that is integrally formed as in the first embodiment. For example, the clamping means 6 may include a plurality of members as in this embodiment. In this embodiment, a resiliently deformable clamping member 30 (supporting portion 8) having a pressing portion 9 formed at an end thereof, and having an L shape in cross section is fixed to an annular fixing member 29 (fixing portion 7) fixed to a housing 3. This clamping member 30 is urged towards a clamp disc 11 by a plurality of compression springs 31 (urging means 10) interposed between the clamping member 30 and the fixing member 29 and provided along a circumference having an axial line of a rotary shaft 5 as center. If, as in the embodiment, the clamping means 6 is formed of a plurality of members, for example, the following advantages are provided: clamp force is increased or decreased by changing the compression springs 31 to those having a different spring constant or only the clamping member 30 needs to be replaced when the pressing portion 9 is worn. Since the plurality of members are secured to each other with bolts, and the pressing portion 9 is displaced by only resiliently deforming the clamping member 30, it is possible to maintain stabilized positioning performance (indexing precision of the index device) over a long period of time without, for example, any rattling between the members.

Figure 6:
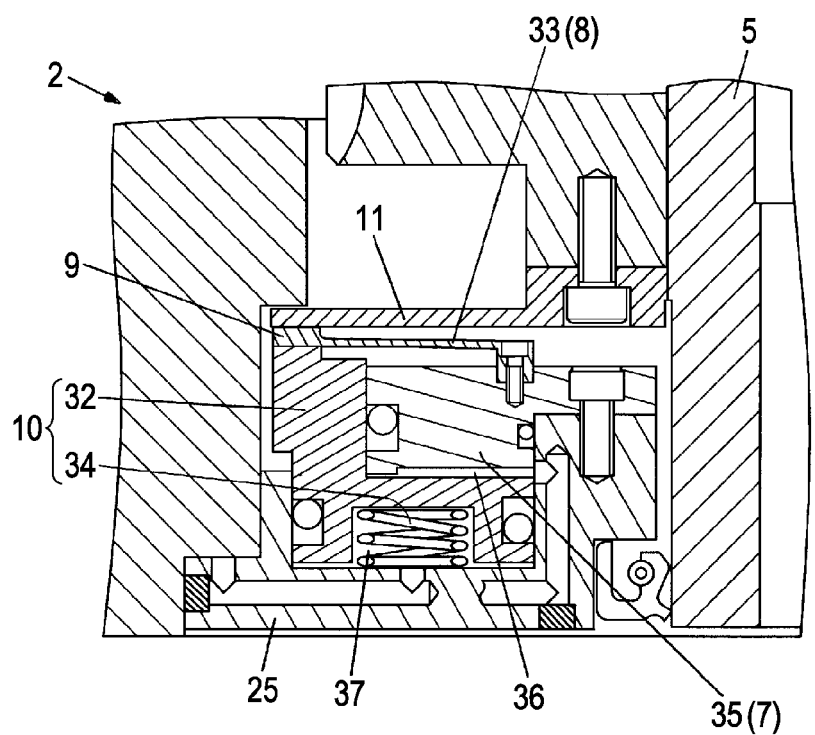
FIG. 6 is a detailed sectional view of the vicinity of a clamping device 2 of the rotary index device 1.

An embodiment shown in FIG. 6 is one in which a clamping member 33 is pressed towards a clamp disc 11 by a piston member 32. That is, in this embodiment, what is called urging means 10 in Claim 1 according to the present invention includes the piston member 32 and a compression spring 34 that urges the piston member 32 towards the clamp disc.

In this embodiment, as in the first embodiment, a case member 25 has an annular groove, and the annular piston member 32 is fitted to and inserted in the groove so as to be movable in an axial direction of the rotary shaft 5. The compression spring 34 is interposed between the piston member 32 and the case member 25 in the groove. A plurality of the compression springs 34 are provided along a circumference whose center is an axial line of the rotary shaft 5. A fixing member 35 corresponding to what is called a fixing portion 7 in Claim 1 according to the present invention is secured to the case member 25 and has a pressure chamber 36, where unclamping operating fluid is supplied, formed between the fixing member 35 and the piston member 32. Further, in the embodiment, operating fluid can be supplied to a pressure chamber 37 provided between the case member 25 and the piston member 32. In addition to urging force (spring force) by the compression springs 34, urging force (fluid pressure) of the operating fluid can act upon the piston member 32, so that clamp force can be increased (retightening can be performed).

The clamping means 6 according to the embodiment is a member that is provided separately from the fixing portion 7 (fixing member 35) and the supporting portion 8 (clamping member 33) and the urging means 10 (piston member 32, compression springs 34). The fixing member 35 and the clamping member 33 are fixed to each other with a bolt, and the pressing portion 9 is displaced by only resiliently deforming the clamping member 33. Therefore, even if, for example, slight rattling occurs in the urging means 10, this does not influence the clamping member 33.

In the rotary index device 1 to which the present invention is directed, the driving means is not limited to the exemplary worm gear mechanism. The driving means (driving source) may be a DD motor (direct drive motor) provided in the aforementioned related art.

The rotary index device (member that is rotationally driven) is not limited to the rotary table device (circular table) according to the embodiments. For example, as discussed in, for example, Japanese Unexamined Patent Application Publication Nos. 5-212646 and 3-178709, the rotary index device may be a device (spindle head) that supports a device (spindle unit) rotationally driving a spindle to which a tool is mounted and that rotates and drives it, or a portion (device) that rotationally drives a spindle head supporting a spindle unit around an axial line that is parallel to a Z axis of a machine tool. In the former case, the spindle unit corresponds to the member that is rotationally driven, and in the latter case, the spindle head corresponds to the member that is rotationally driven.

INDUSTRIAL APPLICABILITY

The present invention can be widely applied to a braking device that brakes, for example, a rotary shaft by clamping a disc.

The invention claimed is:

1. A clamping device (2) for a rotary index device for a machine tool, the rotary index device (1) including a rotary shaft (5), a clamp disc (11), and clamping means (6), the rotary shaft (5) being rotatably provided in a housing (3) and to whose one end portion a member that is rotationally driven (4) is mounted, the clamp disc (11) being mounted to the rotary shaft (5) so as to be incapable of rotating relative to the rotary shaft (5), the clamping means (6) pressing the clamp disc (11) against a clamp surface (12), integrated to the housing (3), and clamping the clamp disc (11) in cooperation with the clamp surface (12), in which the clamping means (6) is normally urged towards the clamp disc (11) by urging means (10) to maintain an index position of the member that is rotationally driven (4), and in which, when an indexing operation is performed, unclamping means (13) stops the urging means (10) from urging the clamping means (6) to cause the member that is rotationally driven (4) to be capable of rotating, wherein the clamping means (6) includes:

a fixing portion (7) fixed to the housing (3);

a resiliently deformable supporting portion (8) joined to the fixing portion (7) at one end thereof, a pressing portion (9) having a face that opposes the clamp disc (11) being provided at the other end thereof; and the urging means (10) that normally urges the supporting portion (8) towards the clamp disc (11) to realize a state in which the clamp disc (11) is pressed by the pressing portion (9), the urging means (10) extending in a circumferential direction along a circumference having an axial line of the rotary shaft (5) as center, and wherein the clamping means (6) is a spring member (14) in which the fixing portion (7) and the supporting portion (8) are integrally formed with each other, and in which the supporting portion (8) functions as the urging means (10).

2. The clamping device (2) for the rotary index device for the machine tool according to claim 1, wherein the clamping means (6) is the spring member (14) that is a single member having a circular shape existing around the rotary shaft (5).

* * * * *